United States Patent [19]
Yang

[11] Patent Number: 5,815,215
[45] Date of Patent: Sep. 29, 1998

[54] APPARATUS FOR CONTROLLING THE LUMINANCE OF VIDEO SIGNALS IN CHARACTER AREAS ON AN ON-SCREEN-DISPLAY

[75] Inventor: Ye-mok Yang, Suwon, Rep. of Korea

[73] Assignee: Samsung Electronics Co., Ltd., Kyungki-do, Rep. of Korea

[21] Appl. No.: 689,051

[22] Filed: Jul. 30, 1996

[30] Foreign Application Priority Data

Jul. 31, 1995 [KR] Rep. of Korea ....................... 95-23464

[51] Int. Cl.$^6$ ................................................. H04N 5/445
[52] U.S. Cl. ........................... 348/569; 348/589; 348/673; 348/687
[58] Field of Search ..................................... 348/468, 563, 348/564, 569, 600, 673, 687, 686, 589; H04N 5/262, 5/278, 5/445, 5/57

[56] References Cited

U.S. PATENT DOCUMENTS 5,264,934  11/1993  Nakagawa ................................ 348/687
5,481,318  1/1996   Flowers .................................... 348/686

FOREIGN PATENT DOCUMENTS 73880   9/1985   Japan ............................. H04N 5/445
324772  11/1992  Japan ............................. H04N 5/445
349795  12/1992  Japan ............................. H04N 5/445

*Primary Examiner*—Glenton B. Burgess
*Attorney, Agent, or Firm*—Sughrue, Mion, Zinn, Macpeak & Seas, PLLC

[57] ABSTRACT

A video signal luminance control apparatus is provided, which includes an input portion for receiving a luminance signal of the video signal, a transistor with a collector receiving the input luminance signal input from the input portion, via a resistor, and a controller which is connected to the base of the transistor for outputting a control signal for controlling the on/off operation of the transistor in an area where an on-screen-display (OSD) character is displayed. A simple transistor receiving the control signal is used to control the luminance of a video signal in an area where an OSD character is displayed, thereby providing a luminance control apparatus for clearly displaying OSD characters.

6 Claims, 2 Drawing Sheets

FIG. 3A — Y

FIG. 3B — CTL

FIG. 3C — Y'

APPARATUS FOR CONTROLLING THE LUMINANCE OF VIDEO SIGNALS IN CHARACTER AREAS ON AN ON-SCREEN-DISPLAY

BACKGROUND OF THE INVENTION

The present invention relates to an apparatus for controlling the luminance of a video signal, and more particularly, to a luminance control apparatus for a video signal in a character area on an on-screen-display (OSD) which lowers the luminance of the video signal to display clearly an OSD character in the area where the OSD character is displayed.

When information other than a video image signal is displayed on a screen using OSD characters, the luminance of the OSD characters is generally not controlled. Thus, when a luminance level of a video signal which forms the background of the OSD characters is high, the OSD characters cannot be recognized. Therefore, to display the OSD characters with clarity, it is necessary to lower the luminance of the video signal in the area where the OSD characters are displayed.

To solve the above-described problem, an integrated circuit (IC) having a luminance control function, such as model CXA1477As of Sony Company Limited, is provided in a video apparatus to lower automatically the luminance level of a video signal in an area where an OSD character is to be displayed.

FIG. 1 is a block diagram of a luminance control apparatus using a conventional IC. The IC used in the FIG. 1 apparatus is the Sony model CXA1477AS. A matrix portion 10 in the IC converts an input luminance signal Y and chrominance signals U and V into pure color signals R, G and B to output the same to a level controller 11. The level controller 11 reduces the luminance of the R, G and B signals by a certain level according to a first controller signal CTL1 applied from a controller 14. The color signals R', G' and B' obtained under control of the level controller 11 are output to a switch portion 12. The switch portion 12 interrupts the output of the above color signals R', G' and B' by a second control signal CTL2 with respect to an area where the OSD character is displayed. At the same time, luminance-controlled color signals R", G" and B" are output from the controller 14 to a mixer 13. As described above, the luminance of the video signal in the area where OSD characters are displayed is controlled, thereby displaying the OSD characters more clearly.

However, it is a defect of the conventional apparatus that it requires an IC having a luminance control function such as the CXA1477AS of Sony.

SUMMARY OF THE INVENTION

To solve the above problem, it is an object of the present invention to provide an apparatus which can display an OSD character clearly by lowering the luminance of a video signal in an OSD character area using a simple transistor circuit rather than an integrated circuit.

To accomplish the above object of the present invention, there is provided a video signal luminance control apparatus, comprising:

an input portion for receiving a luminance signal of the video signal and for outputting the luminance signal;

a resistor having a first end connected to the output of said input portion;

a transistor having a collector connected to the second end of said resistor to receive the luminance signal output from said input portion; and a controller connected to the base of said transistor for outputting a control signal for controlling the on/off operation of said transistor based on whether an on-screen display (OSD) character is to be displayed.

BRIEF DESCRIPTION OF THE DRAWINGS

A preferred embodiment is described with reference to the drawings wherein:

FIGS. 3A through 3C are timing diagrams for explaining the operation of the FIG. 2 apparatus.

DETAILED DESCRIPTION OF THE PREFERRED EMBODIMENT

A preferred embodiment of the present invention will be described below with reference to FIGS. 2 through 3C.

Figure 1:
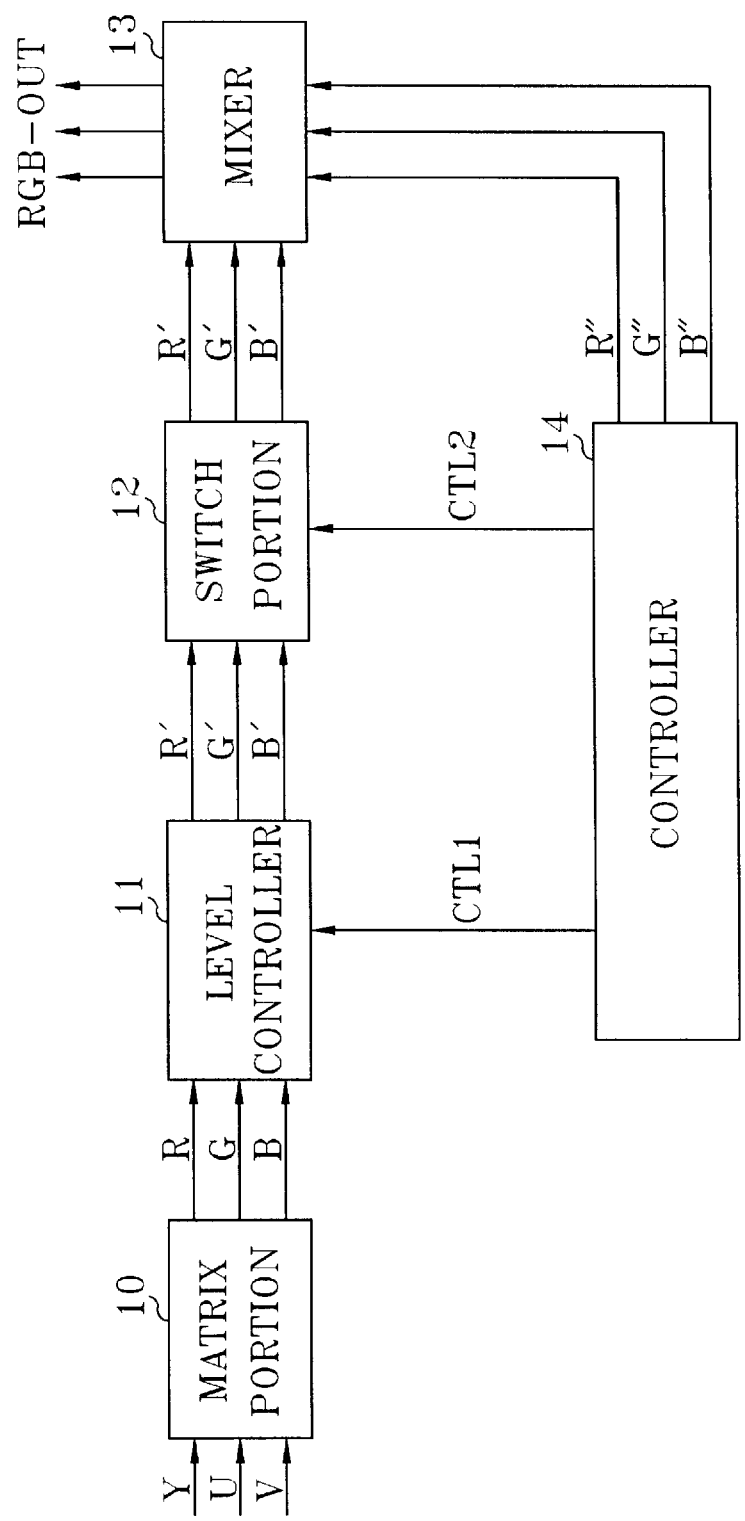
FIG. 1 is a block diagram of a luminance control apparatus using a conventional IC.
Figure 2:
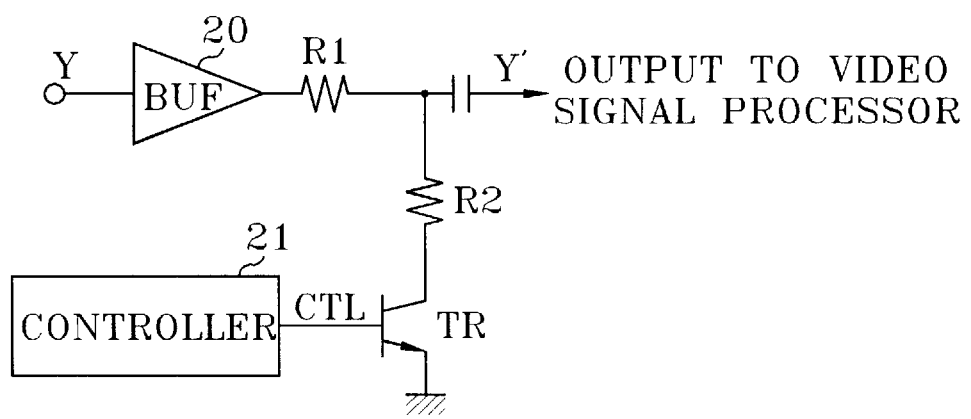
FIG. 2 is a block diagram of a luminance control apparatus for a video signal in an on-screen-display character area according to a preferred embodiment of the present invention.
Figure 2:
Figure 2:
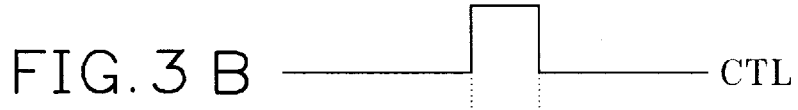
Figure 2:

FIG. 2 shows a luminance control apparatus for a video signal in an on-screen-display (OSD) character area according to a preferred embodiment of the present invention. The apparatus includes a buffer 20 for receiving a luminance signal Y and a transistor TR with a collector is connected to the input luminance signal from the buffer 20 via resistors R1 and R2 and with a base receiving a control signal CTL output from a controller 21.

The input luminance signal Y passes through the buffer 20 and is controlled in voltage level by the transistor TR and resistors R1 and R2 to output a voltage-level-controlled signal Y' to a video signal processor (not shown). The portion of the luminance signal passing through the transistor TR is controlled by the control signal which is output from the controller 21 to the base of the transistor TR. Specifically, the transistor TR is turned on and off by the control signal CTL from the controller 21. In an area of the display where an OSD character is to be displayed, the controller 21 applies the control signal CTL of a high level to the base of the transistor TR to activate the transistor. When the transistor TR is turned on, a portion of the luminance signal, which is connected to the collector of the transistor TR via the resistors R1 and R2, is controlled in voltage by the resistors R1 and R2 to output a luminance-controlled signal Y'. By contrast, in areas of the display where the OSD character is not displayed, the control signal CTL of a low level is input to the base of the transistor TR by the controller 21. The transistor is turned off with the application of the low-level signal. Accordingly, since the transistor TR is turned off, the original input luminance signal is output to the video signal processor.

FIGS. 3A through 3C are timing diagrams for explaining the operation of the FIG. 2 apparatus.

FIG. 3A shows a luminance signal input to the FIG. 2 apparatus. FIG. 3B shows a control signal CTL output from the controller 21 which maintains a high level in an area where an OSD character is to be displayed. FIG. 3C shows lowering of the voltage level of the voltage controlled luminance signal at an interval where the control signal CTL is at a high level.

As described above, the present invention uses a simple transistor to control the luminance of a video signal in an area where an OSD character is displayed to thereby provide a luminance control apparatus for clearly displaying the OSD characters.

While only a certain embodiment of the invention has been specifically described herein, it will apparent that numerous modifications may be made thereto without departing from the spirit and scope of the invention.

What is claimed is:

1. A video signal luminance control apparatus, comprising:
    an input portion for receiving a luminance signal of the video signal and for outputting the luminance signal;
    a resistor having a first end connected to the output of said input portion;
    a transistor having a collector connected to the second end of said resistor to receive the luminance signal output from said input portion; and
    a controller connected to the base of said transistor for outputting a control signal for controlling the on/off operation of said transistor based on whether an on-screen display (OSD) character is to be displayed.

2. A luminance control apparatus according to claim 1, wherein said controller outputs a high level control signal when an OSD character is to be displayed and outputs a low level control signal when no OSD character is to be displayed, and wherein said transistor is an NPN-type transistor.

3. A luminance control apparatus according to claim 2, wherein a voltage controlled luminance signal is output at a node between the first end of said resistor and the output of said input portion to produce voltage controlled luminance.

4. A video signal luminance control apparatus, comprising:
    an input portion for receiving a luminance signal of the video signal and for outputting the luminance signal;
    a first resistor having a first end connected to the output of said input portion;
    a second resistor having a first end connected to the second end of said first resistor;
    a transistor having a collector connected to the second end of said second resistor to receive the luminance signal output from said input portion; and
    a controller connected to the base of said transistor for outputting a control signal for controlling the on/off operation of said transistor based on whether an on-screen display (OSD) character is to be displayed.

5. A luminance control apparatus according to claim 4, wherein said controller outputs a high level control signal when an OSD character is to be displayed and outputs a low level control signal when no OSD character is to be displayed, and wherein said transistor is an NPN-type transistor.

6. A luminance control apparatus according to claim 5, wherein a voltage controlled luminance signal is output at a node between the second end of said first resistor and the first end of said second resistor to produce voltage controlled luminance.

* * * * *